(12) United States Patent
Tseng et al.

(10) Patent No.: US 11,520,176 B2
(45) Date of Patent: Dec. 6, 2022

(54) DISPLAY DEVICE COMPRISING A SINGLE-LAYER POLYMER SUBSTRATE HAVING A PLURALITY OF PROTRUSION ELEMENTS DISPOSED UNDER A TOP SURFACE OF THE SINGLE-LAYER POLYMER SUBSTRATE

(71) Applicant: InnoLux Corporation, Miao-Li County (TW)

(72) Inventors: Yu-Chih Tseng, Miao-Li County (TW); Chu-Hong Lai, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 6 days.

(21) Appl. No.: 16/730,934

(22) Filed: Dec. 30, 2019

(65) Prior Publication Data
US 2020/0249516 A1   Aug. 6, 2020

(30) Foreign Application Priority Data
Feb. 1, 2019   (CN) .................. 201910105115.X (51) Int. Cl.
*G02F 1/1333*   (2006.01)
*G02F 1/1368*   (2006.01)
*G02F 1/16755*   (2019.01)

(52) U.S. Cl.
CPC ...... *G02F 1/133305* (2013.01); *G02F 1/1368* (2013.01); *G02F 1/16755* (2019.01)

(58) Field of Classification Search
CPC ......... G02F 1/133368; G02F 1/133509; G02F 1/16755
See application file for complete search history.

(56) References Cited

U.S. PATENT DOCUMENTS

| | | | |
|---|---|---|---|
| 6,118,512 A * | 9/2000 | Sakaigawa | G02F 1/141 349/166 |
| 2008/0218670 A1* | 9/2008 | Kumai | G02F 1/133555 349/114 |
| 2010/0182686 A1* | 7/2010 | Fukushima | H04N 13/31 359/463 |
| 2010/0215873 A1 | 8/2010 | Liao | |
| 2012/0069282 A1* | 3/2012 | Okazaki | G02F 1/134363 349/139 |
| 2012/0242610 A1* | 9/2012 | Yasumatsu | G06F 3/045 345/173 |

(Continued)

FOREIGN PATENT DOCUMENTS

| | | | | |
|---|---|---|---|---|
| CN | 101728414 A | | 6/2010 | |
| CN | 103107131 A | * | 5/2013 | ....... H01L 21/28556 |

(Continued)

*Primary Examiner* — Paul C Lee
(74) *Attorney, Agent, or Firm* — Winston Hsu (57) ABSTRACT

A display device is provided and includes a first polymer substrate, a plurality of thin-film transistors, a second polymer substrate, and a liquid crystal layer. The thin-film transistors are disposed on the first polymer substrate. The second polymer substrate is disposed opposite to the first polymer substrate. The liquid crystal layer is disposed between the first polymer substrate and the second polymer substrate. The first polymer substrate has a first thickness, the second polymer substrate has a second thickness, and the first thickness is greater than the second thickness.

14 Claims, 10 Drawing Sheets

(56) References Cited

U.S. PATENT DOCUMENTS

| | | | |
|---|---|---|---|
| 2014/0354933 A1* | 12/2014 | Tsai | G02F 1/1368 |
| | | | 349/138 |
| 2016/0195757 A1 | 7/2016 | Lim | |
| 2016/0291425 A1* | 10/2016 | Ma | G02F 1/134363 |
| 2017/0148822 A1 | 5/2017 | Hu | |
| 2017/0179164 A1* | 6/2017 | Choi | H01L 29/7869 |
| 2017/0257939 A1* | 9/2017 | Sano | H05K 1/028 |
| 2017/0309843 A1* | 10/2017 | Kim | B32B 7/12 |
| 2017/0358571 A1* | 12/2017 | Chen | H01L 27/04 |
| 2017/0373264 A1* | 12/2017 | Liu | H01L 51/5012 |
| 2018/0217434 A1 | 8/2018 | Kawata | |

FOREIGN PATENT DOCUMENTS

| | | | | |
|---|---|---|---|---|
| CN | 103185988 A | * | 7/2013 | ....... G02F 1/133707 |
| CN | 105355634 A | | 2/2016 | |
| CN | 105974637 A | * | 9/2016 | ........... G02F 1/1368 |
| CN | 110456545 A | * | 11/2019 | ....... G02F 1/133528 |
| JP | 2004361825 A | * | 12/2004 | ....... G02F 1/133555 |
| JP | 2007121740 A | * | 5/2007 | .............. G02F 1/07 |
| KR | 10-2016-0083996 A | | 7/2016 | |

\* cited by examiner

DISPLAY DEVICE COMPRISING A SINGLE-LAYER POLYMER SUBSTRATE HAVING A PLURALITY OF PROTRUSION ELEMENTS DISPOSED UNDER A TOP SURFACE OF THE SINGLE-LAYER POLYMER SUBSTRATE

CROSS REFERENCE TO RELATED APPLICATION

This application claims the benefit of Chinese Patent Application Serial No. 201910105115.X, filed Feb. 1, 2019, the entire content of which is incorporated herein by reference.

BACKGROUND OF THE DISCLOSURE

1. Field of the Disclosure

The present disclosure relates to an electronic device, and more particularly to an electronic device using flexible material as substrate.

2. Description of the Prior Art

With the progress of technology, display devices are gradually developed towards the trend of lightness and thinness. In liquid crystal display devices, glass substrate can be replaced by flexible substrate formed of plastic material so as to reduce whole weight and whole thickness, which may be called plastic liquid crystal display (PLCD). However, the PLCD still has several disadvantages needed to be improved. One of the disadvantages is that when forming the plastic substrate, foreign matters may exist or solute of the plastic material is easy to precipitate out due to poor process cleanliness, resulting in the surface uplift of the plastic substrate used to form the components. For this reason, metal traces formed on the plastic substrate is not easily formed on the protruding surface, such that the metal lines on the protruding surface are easily broken or have excessive resistance, causing poor display of the display device, such as bright line or bright spot. Another disadvantage is that since thicknesses of two plastic substrates of the liquid crystal display device are thinned such that asymmetrical stresses on the thin-film transistor layer of the liquid crystal display device is significantly generated, electrodes, signal lines or insulation layers in the thin-film transistor layer are easily broken due to bending, resulting in poor display of the liquid crystal display device.

SUMMARY OF THE DISCLOSURE

The present disclosure provides a display device including a first polymer substrate, a plurality of thin-film transistors, a second polymer substrate, and a liquid crystal layer. The thin-film transistors are disposed on the first polymer substrate. The second polymer substrate is disposed opposite to the first polymer substrate. The liquid crystal layer is disposed between the first polymer substrate and the second polymer substrate. The first polymer substrate has a first thickness, the second polymer substrate has a second thickness, and the first thickness is greater than the second thickness.

These and other objectives of the present disclosure will no doubt become obvious to those of ordinary skill in the art after reading the following detailed description of the embodiment that is illustrated in the various figures and drawings.

DETAILED DESCRIPTION

The present disclosure may be understood by reference to the following detailed description, taken in conjunction with the drawings as described below. It is noted that, for purposes of illustrative clarity and being easily understood by the readers, various drawings of this disclosure show a portion of the electronic device, and certain components in various drawings may not be drawn to scale. In addition, the number and dimension of each component shown in drawings are only illustrative and are not intended to limit the scope of the present disclosure.

Certain terms are used throughout the description and following claims to refer to particular components. As one skilled in the art will understand, electronic equipment manufacturers may refer to a component by different names. This document does not intend to distinguish between components that differ in name but not function. In the following description and in the claims, the terms "include", "comprise" and "have" are used in an open-ended fashion, and thus should be interpreted to mean "include, but not limited to . . . ".

Spatially relative terms, such as "above", "on", "beneath", "below", "under", "left", "right", "before", "front", "after", "behind" and the like, used in the following embodiments only refer to the directions in the drawings and are not intended to limit the present disclosure. It should be understood that the components in the drawings may be disposed in any kind of formation known by one skilled in the related art to describe the components in a certain way. Further-more, when one layer is "on" another layer or a substrate, it can be "directly on" the another layer or the substrate, or the one layer is on the another layer or the substrate, or another layer may be sandwiched between the one layer and the another layer or the substrate.

In addition, in this specification, relative expressions, such as "lower", "bottom", "upper" or "top", may be used to describe the position of one component relative to another component. It is understood that if the device in the figure is turned over, components described as "lower" would then be oriented to be "upper" components.

Here, the term "about", "approximately" and "substantially" usually means within 20% of a given value or range of, preferably within 10%, and more preferably within 5%. The given approximately as the number, meaning without being specified, still implies "about", "approximately" and "substantially" means.

Although the terms such as first, second, etc. may be used in the description and following claims to describe various components in claims, these terms doesn't mean or represent the claimed components have order and doesn't represent the order of one claimed component and another one claimed component, or the sequence in manufacturing method. These terms are used to discriminate a claimed component with a denomination from another one claimed component with the same denomination.

It should be noted that the technical features in different embodiments described in the following description can be replaced, recombined, or mixed with one another to constitute another embodiment without departing from the spirit of the present disclosure.

Figure 1:
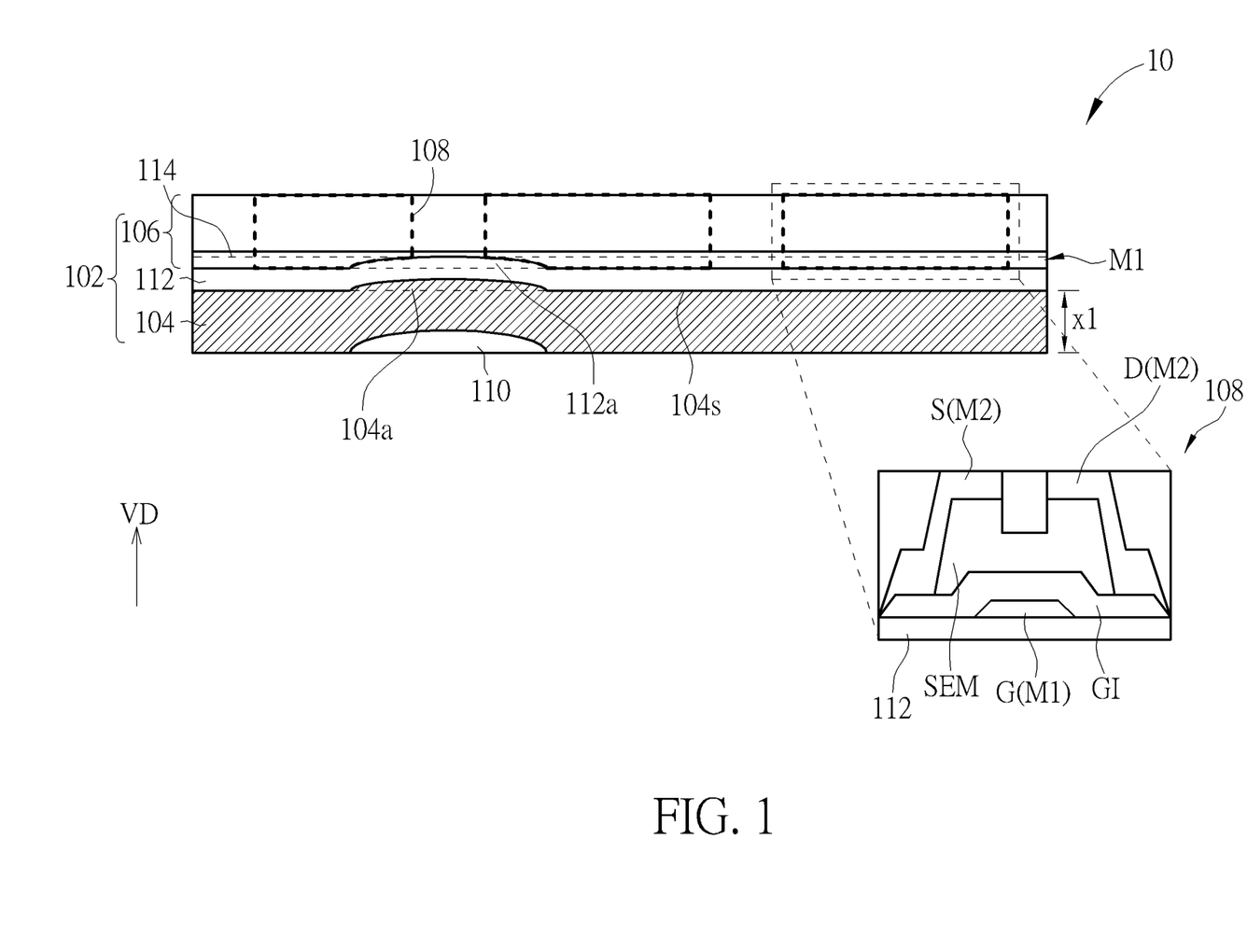
FIG. 1 is a schematic diagram illustrating a cross-sectional view of an electronic device according to a first embodiment of the present disclosure.

FIG. 1 is a schematic diagram illustrating a cross-sectional view of an electronic device according to a first embodiment of the present disclosure. The electronic device 10 includes a first component substrate 102, and the first component substrate 102 includes a first polymer substrate 104 and a component layer 106. The first polymer substrate 104 is used for supporting the component layer 106 and has a bendable property, for example the first polymer substrate 104 includes a polymer substrate or other suitable substrate. For instance, a material of the first polymer substrate 104 may include polyimide(PI), polyethylene terephthalate (PET), polycarbonate(PC), polyethersulfone(PES), polybutylene terephthalate (PBT), polyethylene naphthalate (PEN), polyarylate(PAR), other suitable materials or any combination thereof, but not limited thereto. The component layer 106 is disposed on the first polymer substrate 104, and the component layer 106 may include any required driving component, display component or component without displaying function according to the type of the electronic device 10. In some embodiments, the electronic device 10 may be a liquid crystal display device, so that the first component substrate 102 may be a thin-film transistor substrate, and the component layer 106 may include a plurality of thin-film transistors 108 for controlling gray scales of pixels. For example, the thin-film transistor 108 may include a gate electrode a gate insulation layer GI, a semiconductor layer SEM, a source electrode S, and a drain electrode D, in which the gate electrode G may be formed of a first metal pattern layer M1, and the source electrode S and the drain electrode D may be formed of a second metal pattern layer M2. In some embodiments, the display device may be a self-emissive display device, so the component layer 106 may include a plurality of thin-film transistors 108, control lines, and light-emitting components for displaying images. The light-emitting component may for example be an organic light emitting diode(OLED) or an inorganic light emitting diode, such as a quantum dot light emitting diode (Q-LED), a micro light emitting diode(micro LED) or a mini light emitting diode (mini-LED). In another embodiment, a plurality of liquid crystal display devices or a plurality of self-emissive display devices may be used to form a large format tiling display. In some embodiments, the component layer 106 may further include insulation layers or protective layers for electrically insulating different lines or electrodes from one another. In some embodiments, the display device may further include an encapsulation layer, a barrier layer or a cover film disposed on the component layer 106 and used for protecting the thin-film transistors 108 and the light-emitting components. In some embodiments, the component layer 106 may have no display function, for example may include liquid crystal antenna. In such situation, the component layer 106 may include a dielectric layer and a circuit layer, and the dielectric layer may be the liquid crystal layer or other suitable dielectric materials. The circuit layer may be formed by a thin-film process and may optionally include switch component(s), such as amorphous thin-film transistor, low temperature polysilicon thin-film transistor, metal-oxide thin-film transistor, but not limited thereto. In one embodiment, if the component layer 106 is the liquid crystal antenna, a working area of the liquid crystal antenna refers to a range corresponding to an actual effective operating region, such as the region that can transmit or receive electromagnetic wave signals, light signals, etc. Other regions that are not the actual effective operating region correspond to a non-working area. The description mentioned above is only as an example and is not limited. In some embodiments, the first component substrate 102 may be a color filter substrate, in which the component layer 106 may include a black matrix layer and/or a color filter layer. The component layer 106 of the present disclosure is not limited to the mentioned above.

It should be noted that since the first polymer substrate 104 has a bendable property, before forming the component layer 106 on the first polymer substrate 104, the first polymer substrate 104 may be formed on a carrier plate (not shown), for example formed on a glass substrate. In some embodiments, the first polymer substrate 104 may be formed by coating a solution on the carrier plate, then shaping the solution by a first baking, and then completely curing the solution by a second baking. In another embodiment, the first polymer substrate 104 may be formed by coating the solution on the carrier plate and then completely curing the solution by irradiation (e.g. ultraviolet light or infrared light). The mentioned above is only for an example, but not limited thereto. Due to insufficient cleanliness of the process environment, some protrusion elements 110, such as foreign matters or suspended particles, may exist on the carrier plate. Alternatively, because the solute in the solution may not be dissolved in the solvent during baking, a part of solute in the solution close to the carrier plate will be separated out. Thus, the formed first polymer substrate 104 includes a plurality of protrusion elements 110 disposed under the top surface 104s of the first polymer substrate 104. Since the protrusion elements 110 have a certain thickness, when the thickness of the first polymer substrate 104 formed on the carrier plate is too small, the top surface 104s of the first polymer substrate 104 corresponding to the protrusion element 110 will protrude, which means the first polymer substrate 104 includes a plurality of protrusion portions 104a protruding from the top surface 104s. A cross-sectional shape of the top surface 104s of one of the protrusion portions 104 is not limited to be curved and may be uneven. The description mentioned above is only as an example and is not limited. The height of the protrusion portion 104a may be defined as an absolute value of the difference between an average height of a part of the top surface 104s without the protrusion portion 104a and a top height of the protrusion portion 104a in a top view direction VD of the electronic device 10. The range of the absolute value of the difference may be substantially less than or equal to 3 µm. The description mentioned above is only as an example and is not limited. The top height of the protrusion portion 104a may refer to the following related description of FIG. 11. In one embodiment, the top surface 104s without the protrusion portion 104a may not be a perfect flat surface, so the average height of the top surface 104s may be obtained by averaging a top height and a bottom height in a unit region (e.g. a region of 10 µm×10 µm), but this description is only as an example and is not limited. The top height and the bottom height of the top surface 104s may be obtained, for example, respectively by calculating an absolute value of the difference between the top level and a reference level and an absolute value of the difference between the bottom level and the reference level based on the reference level, in which in the cross-sectional view of the electronic device 10, the bottom level is located between the top level and the reference level, and the reference level may be for example a bottom surface of the first polymer substrate 104 opposite to the top surface 104s. In the present disclosure, since the first polymer substrate 104 is formed by baking the solution, when the thickness of the coated first polymer substrate 104 is increased, the protruding height of the protrusion portion 104a may be reduced, so as to improve flatness of the top surface 104s of the first polymer substrate 104. Accordingly, damage to the component layer 106 formed on the first polymer substrate 104 may be mitigated. In some embodiments, the height of the protrusion portion 104a may be reduced by altering the temperature in stages during the second baking. The thin-film transistor 108 in the component layer 106 shown in FIG. 1 is a bottom gate type for an example, and the first metal pattern layer M1 of the component layer 106 (that may include scan line (not shown) and the gate electrode G of the thin-film transistor) is formed on the first polymer substrate 104. Since the height of the protrusion portion 104a is reduced to make the thickness of the first metal pattern layer M1 be greater than the height of the protrusion portion 104a, the first metal pattern layer M1 will not be broken or the resistance of the first metal pattern layer M1 will not be significantly reduced when the first metal pattern layer M1 crosses the protrusion portion 104a. For example, the first polymer substrate 104 may have a first thickness x1 that is greater than or equal to 5 µm and less than or equal to 45 µm, but not limited thereto. The height of the protrusion portion 104a may be for example less than 2 µm, but not limited thereto.

In some embodiments, the first component substrate 102 may optionally include a stress buffer layer 112 disposed between the component layer 106 and the first polymer substrate 104. Since stress exists between the first polymer substrate 104 formed on the carrier plate and the carrier plate, a part of the first polymer substrate 104 close to the edge of the first polymer substrate 104 will be bent towards a side of the carrier plate opposite to the first polymer substrate 104, so as to form the curved first polymer substrate 104. By means of forming the stress buffer layer 112 on a side of the first polymer substrate 104 opposite to the carrier plate, the bending phenomenon of the first polymer substrate 104 can be mitigated, thereby facilitating the formation of the component layer 106 on the first polymer substrate 104. For example, the stress buffer layer 112 may include silicon oxide, silicon nitride or a combination thereof, so as to balance the stress of the carrier plate on the first polymer substrate 104. The thickness of the stress buffer layer 112 may be for example greater than or equal to about 2500 angstroms and less than or equal to about 7500 angstroms, but not limited thereto. In some embodiments, the stress buffer layer 112 may be conformally formed on the top surface 104s of the first polymer substrate 104, so that a part of the stress buffer layer 112 corresponding to the protrusion portion 104a of the first polymer substrate 104 may also have a protrusion portion 112a. In such situation, the thickness of the first metal pattern layer M1 may still be greater than the height of the protrusion portion 112a, and the resistance of the part of the first metal pattern layer M1 crossing the protrusion portion 104a is not affected by the protrusion portion 112a. The height of the protrusion portion 112a may be for example less than 2 µm, but not limited thereto.

In addition, the electronic device 10 has a neutral plane 114 while being bent, in which the stress on the components of the electronic device 10 located on the neutral plane is close to or equal to 0 when the electronic device 10 is bent. In the present disclosure, by means of increasing the thickness x1 of the first polymer substrate 104, the neutral plane 114 of the electronic device 10 may be adjusted to be located adjacent to the first component substrate 102 or in first component substrate 102, such that the component layer 106 may be close to the neutral plane 114. Accordingly, the stress on the component layer 106 while being bent can be mitigated, thereby reducing damage to the component layer 106 due to bending.

Figure 2A:
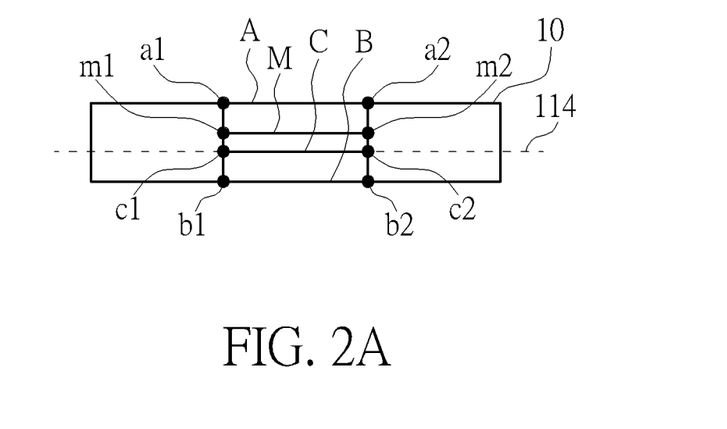
FIG. 2A and FIG. 2B are schematic diagrams illustrating cross-sectional views of the electronic device before bending and after bending respectively.
Figure 2B:
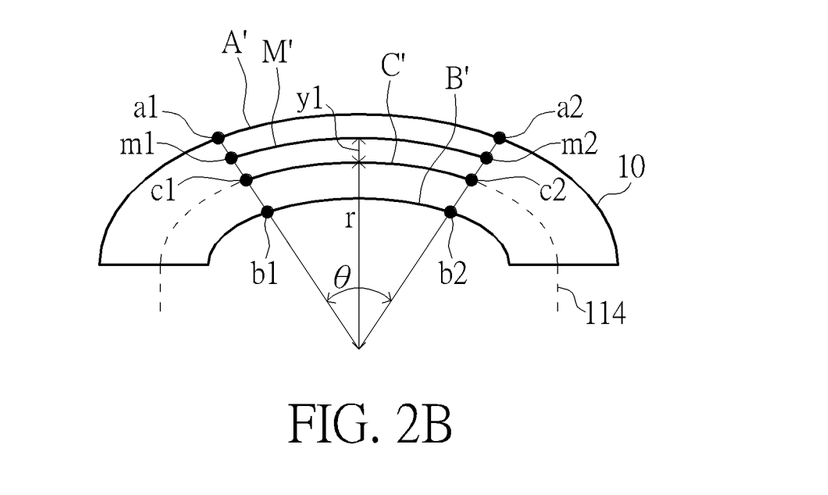
Figure 3:
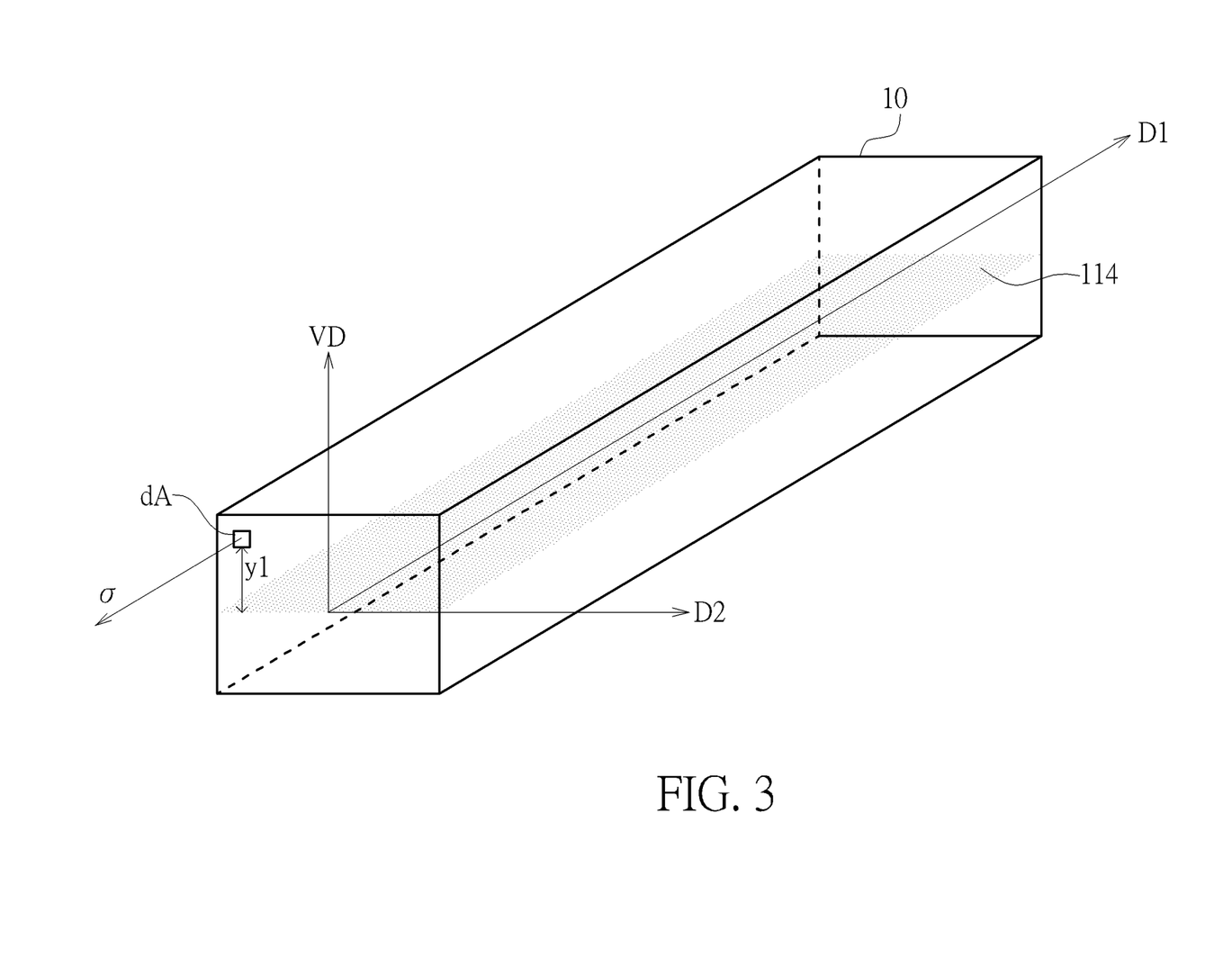
FIG. 3 is a schematic diagram illustrating a perspective view of the electronic device and the neutral plane.

The definition of the neutral plane 114 of the electronic device 10 is further detailed in the following description. FIG. 2A and FIG. 2B are schematic diagrams illustrating cross-sectional views of the electronic device before bending and after bending respectively, and FIG. 3 is a schematic diagram illustrating a perspective view of the electronic device and the neutral plane. When the electronic device 10 is not bent, a segment A from point a1 to point a2, a segment B from point b1 to point b2 and a segment C from point c1 to point c2 have substantially the same length. When the electronic device 10 is bent, a segment A' from point a1 to point a2, a segment B' from point b1 to point b2 and a segment C' from point c1 to point c2 have different lengths, in which when the segment C and the segment C' have substantially the same length, the segment C and the segment C' may serve as being located on the neutral plane 114.

The following description further mentions that the segment C and the segment C' substantially having no change in length before and after bending should be located on the neutral plane having stress of 0. As shown in FIG. 2A, a segment M from point m1 to point m2 and the segment C have a distance, for example a shortest distance. When the electronic device 10 is not bent, the segment M from point m1 to point m2 may have substantially the same length as the segment C. As shown in FIG. 2B, when the electronic device 10 is bent, the length of the segment M' from point m1 to point m2 may be $(r+y1)\times\theta$, where $r$ is a radius of curvature of the segment C' when the electronic device 10 is bent, $\theta$ is a bending angle of the segment C', and $y1$ is a difference between a radius of curvature of the segment M' and the radius of curvature of the segment C', for example is a shortest distance between the segment M' and the segment C'. Thus, a strain value $\varepsilon$ of the segment M' resulted from bending can be obtained to be $[(r+y1)\times\theta-r\times\theta]/r\times\theta$, thereby obtaining the strain value $\varepsilon$ as $y1/r$. According to the Hooke's law, the stress $\sigma$ of the segment M' is $E\times y1/r$, where E is an elastic constant. As shown in FIG. 3, a sum of force F on the whole electronic device 10 is a sum of the stresses σ on all unit areas dA, as the following formula:

$F=\int \sigma dA$

When the sum of force F is 0, the stress σ may be introduced into the above formula to obtain $$\frac{E}{r}\int y1dA = 0.$$

Since E and r are not 0, $\int y1dA=0$ is obtained, which means y1 is 0. As can be seen, the segment C and the segment C' substantially having no change in length before and after bending are located at position that the sum of force F is 0, which means the stress on the electronic device 114 on the neutral plane 114 is 0. The neutral plane 114 of the electronic device 10 may be calculated by stress calculation software, such as Abaqus or ANSYS software, but not limited thereto. The neutral plane 114 is not necessary to be located at center of the electronic device 10, and the position of the neutral plane 114 is calculated according to the materials of the film layers and stresses between the films or layers of the electronic device 10.

As shown in FIG. 1, in this embodiment, by means of increasing the thickness of the first polymer substrate 104, the neutral plane 114 of the electronic device 10 can be adjusted to be located in the first component substrate 102, for example the neutral plane 114 can be located in the component layer 106, such that the stress on the thin-film transistor 108 and lines in the component layer 106 when bending the electronic device 10 can be mitigated, thereby reducing the damage to the thin-film transistor 108 and lines due to bending.

The electronic device of the present disclosure is not limited to the above-mentioned embodiment and may have different variant embodiments or other embodiments. To simplify the description, same components in other embodiments would be labeled with the same symbols in the first embodiment. To compare the dissimilarities among the first embodiment and other embodiments conveniently, the following description will detail the dissimilarities among the first embodiment and other embodiments and the identical features will not be redundantly described.

Figure 4:
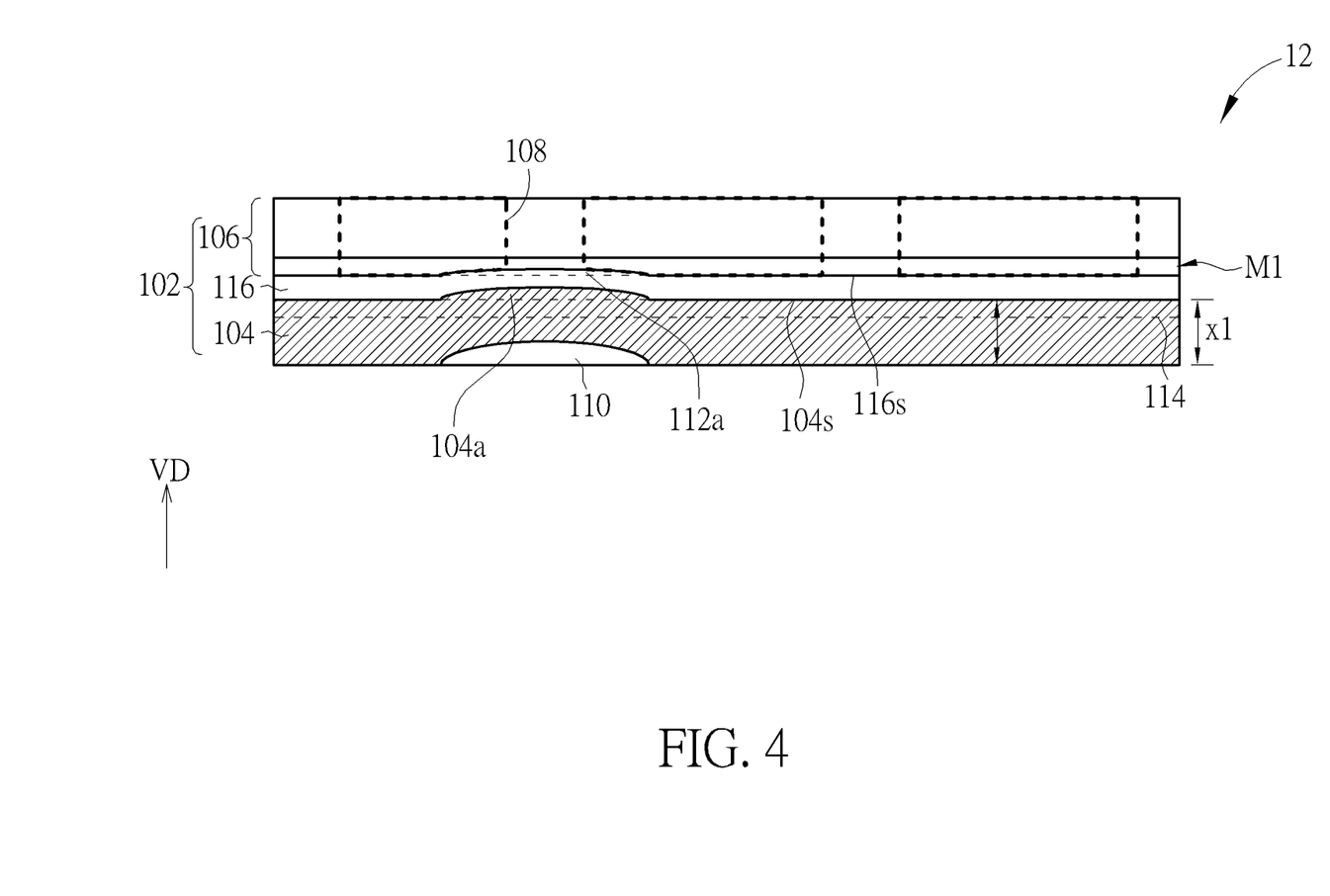
FIG. 4 is a schematic diagram illustrating a cross-sectional view of an electronic device according to a variant embodiment of the first embodiment of the present disclosure.

FIG. 4 is a schematic diagram illustrating a cross-sectional view of an electronic device according to a variant embodiment of the first embodiment of the present disclosure. In this variant embodiment, the electronic device 12 may not include the stress buffer layer and may include a transparent photoresist layer 116 disposed between the component layer 106 and the first polymer substrate 104. Specifically, the transparent photoresist layer 116 is formed on the top surface 104s of the first polymer substrate 104 before forming the component layer 106. Because the transparent photoresist layer 116 has a fluid property, the top surface 116s of the formed transparent photoresist layer 116 has better flatness as compared with the top surface 104s of the first polymer substrate 104, thereby facilitating the manufacturing of the component layer 106. In some embodiments, the electronic device 12 may also include the stress buffer layer 112 formed between the transparent photoresist layer 116 and the first polymer substrate 104.

Figure 5:
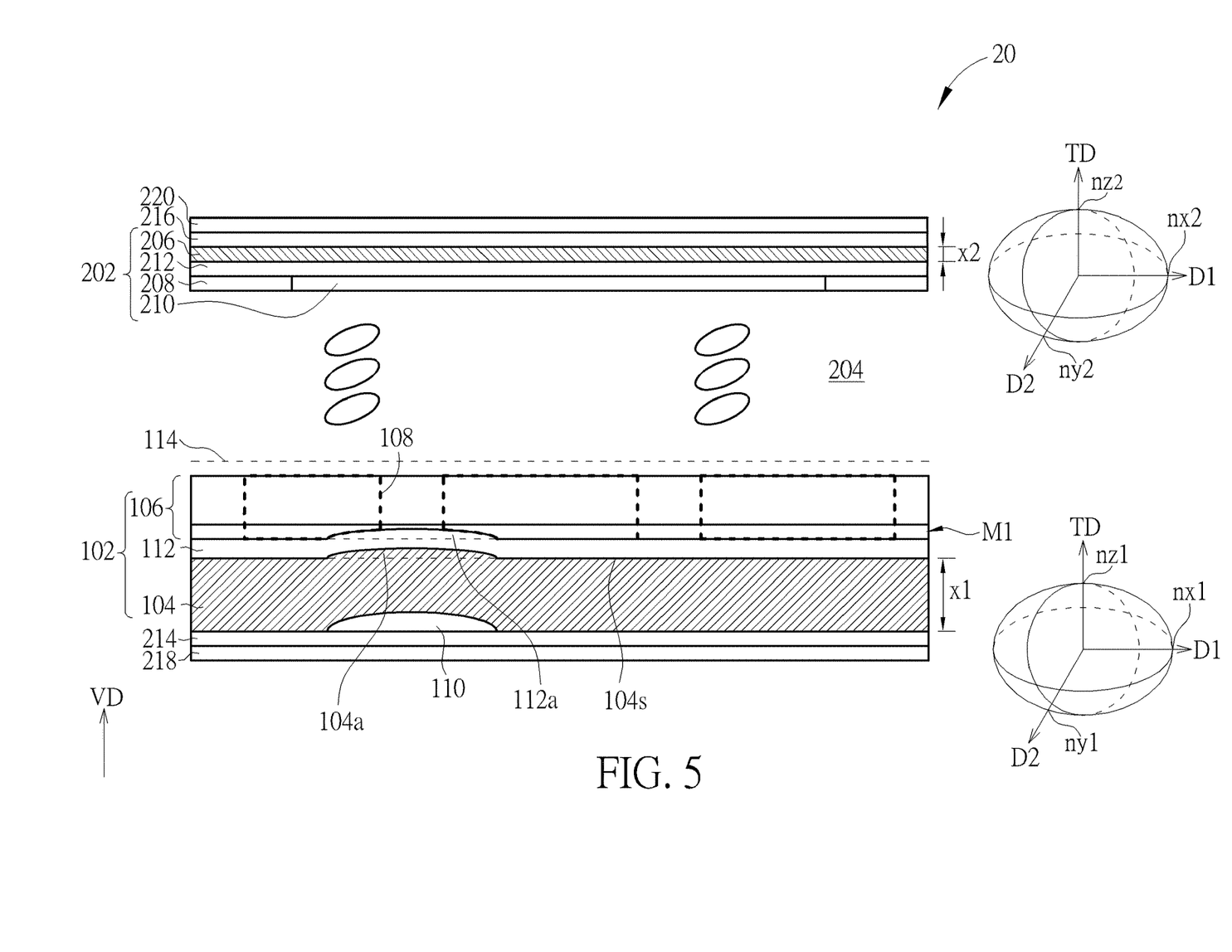
FIG. 5 is a schematic diagram illustrating a cross-sectional view of an electronic device according to a second embodiment of the present disclosure.
Figure 6:
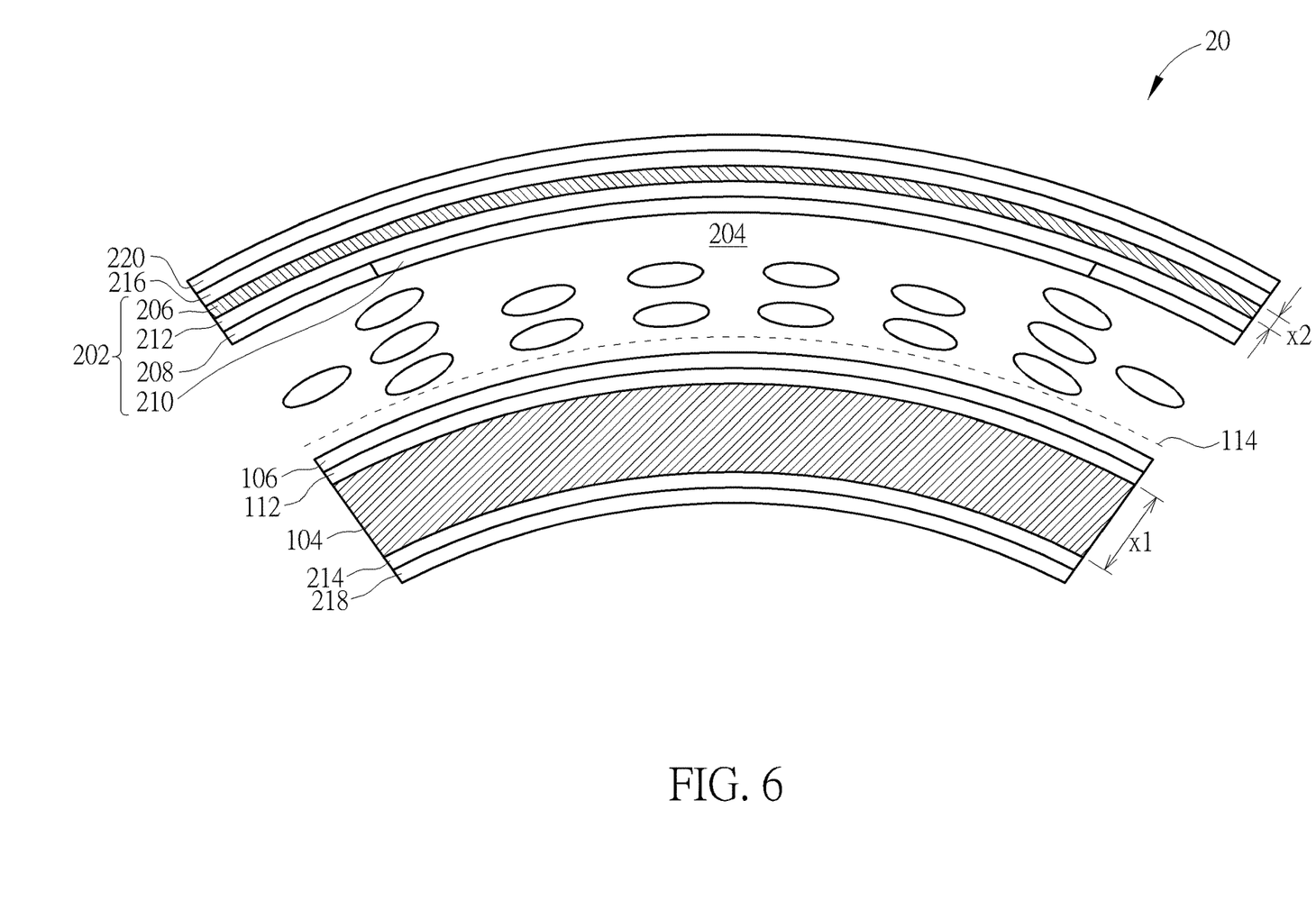
FIG. 6 is a schematic diagram illustrating a cross-sectional view of the electronic device during bending according to the second embodiment of the present disclosure.

FIG. 5 is a schematic diagram illustrating a cross-sectional view of an electronic device according to a second embodiment of the present disclosure, and FIG. 6 is a schematic diagram illustrating a cross-sectional view of the electronic device during bending according to the second embodiment of the present disclosure. For clearly illustrating the bending of each film layer and for the reason that illustration of the protrusion elements and the protrusion portions may blur during bending, FIG. 6 omits the protrusion elements and the protrusion portions, but is not limited thereto. The difference between the electronic device 20 of this embodiment and the electronic device 10 shown in FIG. 1 is that the electronic device 20 may be a liquid crystal display device, for example, it may further include a second component substrate 202 and a liquid crystal layer 204, and the liquid crystal layer 204 is disposed between the first component substrate 102 and the second component substrate 202. The second component substrate 202 may include a second polymer substrate 206 disposed opposite to the first polymer substrate 104. The second polymer substrate 206 may include, for example, a polymer substrate or other suitable substrates. For example, a material of the second polymer substrate 206 may include polyimide (PI), polyethylene terephthalate (PET), polycarbonate (PC), polyether sulfone (PES), polybutylene terephthalate (PBT), polyethylene naphthalate (PEN) or polyarylate (PAR), other suitable materials, or any combination thereof, but not limited thereto. The second polymer substrate 206 has a second thickness x2. In order to reduce the stress on the component layer 106, in the top view direction VD of the electronic device 20, the first thickness x1 of the first polymer substrate 104 may be adjusted to be greater than the second thickness x2 of the second polymer substrate 206, so that a distance between the neutral plane 114 and the first polymer substrate 104 can be less than a distance between the neutral plane 114 and the second polymer substrate 206. For example, the neutral plane 114 of this embodiment may be located in the liquid crystal layer 204 near the component layer 106. In some embodiments, the neutral plane 114 may also be located between the liquid crystal layer 204 and the first polymer substrate 104 (as shown in FIG. 1) or in the first polymer substrate 104 (as shown in FIG. 4). For example, the first thickness x1 and the second thickness x2 may conform to the formula: $0<(x1-x2)/x1\le 0.9$. $(x1-x2)/x1$ may be, for example, greater than or equal to 0.7 and less than or equal to 0.9. The second thickness x2 may be, for example, greater than or equal to about 5 μm and less than or equal to about 45 μm.

In this embodiment, the second component substrate 202 may further include a black matrix 208 and a color filter layer 210 disposed between the liquid crystal layer 204 and the second polymer substrate 206. The color filter layer 210 may include color filters of different colors (not shown), such as red color filters, green color filters, and blue color filters, which are respectively disposed corresponding to different openings of the black matrix 208. In some embodiments, the second component substrate 202 may further optionally include another stress buffer layer 212 disposed between the color filter layer 210 and the second polymer substrate 206 and between the black matrix 208 and the second polymer substrate 206. The stress buffer layer 212 may have the same function and structure as the stress buffer layer 112, and will not be redundantly described in detail.

In some embodiments, in order to reduce light leakage in the dark state, the display device 20 may further include a first phase retardation film 214 and a second phase retardation film 216. The first phase retardation film 214 is disposed on a side of the first polymer substrate 104 opposite to the thin film transistors 108, and the second phase retardation film 216 is disposed on a side of the second polymer substrate 206 opposite to the color filter layer 210. It should be noted that the first polymer substrate 104 has a phase retardation property, so the first phase retardation film 214 can be used to compensate for the phase retardation of the first polymer substrate 104. For example, the first polymer substrate 104 has a phase retardation property of -C plate, that is, the refractive index nx1 of the first polymer substrate 104 in a first direction D1 and the refractive index ny1 of the first polymer substrate 104 in a second direction D2 may be substantially equal to each other, and the refractive index nz1 of the first polymer substrate 104 in a film thickness direction TD may be less than the refractive index nx1 of the first polymer substrate 104 in the first direction D1, in which the first direction D1 and the second direction D2 are located on a plane perpendicular to the film thickness direction TD, and the film thickness direction TD may be, for example, the top view direction VD of the electronic device 20. Therefore, the phase retardation value R0(that is (nx1−ny1)×d) of the first polymer substrate 104 in an in-plane direction is about 0, and the phase retardation value Rth(that is [(nx1+ny1)/2−nz1]×d) in the film thickness direction TD is not 0, where d is the thickness of corresponding film. In order to compensate for the phase retardation of the first polymer substrate 104, the first phase retardation film 214 may, for example, have a phase retardation property of +C plate, that is, the refractive index of the first phase retardation film 214 in the first direction D1 and the refractive index in the second direction D2 may be substantially equal to each other, and the refractive index of the first phase retardation film 214 in the film thickness direction TD is greater than the refractive index nx1 of the first phase retardation film 214 in the first direction D1 and the refractive index ny1 of the first phase retardation film 214 in the second direction D2. Therefore, the phase retardation value of the first phase retardation film 214 in the film thickness direction TD is also not 0. Since the increase of the first thickness x1 of the first polymer substrate 104 needs to increase the phase retardation value of the first phase retardation film 214 in the film thickness direction TD, in order to avoid exceeding the phase retardation value that the first phase retardation film 214 can compensate for, the first thickness x1 of the first polymer substrate 104 may be less than or equal to 45 μm. For example, the phase retardation value of the first phase retardation film 214 in the film thickness direction TD may be greater than 0 and less than or equal to 300 nm. Similarly, for example, the second polymer substrate 206 may have a phase retardation property of —C plate, that is, the refractive index nx2 of the second polymer substrate 206 in the first direction D1 and the refractive index ny2 of the second polymer substrate 206 in the second direction D2 may be substantially equal to each other, and the refractive index nz2 of the second polymer substrate 206 in the film thickness direction TD is less than the refractive index nx2 of the second polymer substrate 206 in the first direction D1. Therefore, the phase retardation value R0(that is (nx2−ny2)×d) of the second polymer substrate 206 in the in-plane direction is about 0, and the phase retardation value Rth (that is [(nx2+ny2)/2−nz2]×d) in the film thickness direction TD is not 0. In order to avoid exceeding the phase retardation value that the second phase retardation film 216 can compensate for, the second thickness x2 of the second polymer substrate 206 may be less than or equal to 45 μm. The phase retardation value that the second phase retardation film can compensate for in the film thickness direction TD may be, for example, greater than 0 and less than or equal to 300 nm. In some embodiments, the display device 20 may further include a first polarizer 218 and a second polarizer 220, in which the first phase retardation film 214 is located between the first polarizer 218 and the first polymer substrate 104, and the second phase retardation film 216 is located between the second polarizer 220 and the second polymer substrate 206.

In some embodiments, the first polymer substrate 104 has a color variation of 0.002 on the x coordinate of the CIE 1931 color space and a color variation of 0.003 on the y coordinate of the CIE 1931 color space every 10 μm of thickness. In other words, when the light passes through the first polymer substrate 104 with a thickness of 10 μm, the x coordinate value of the light in the CIE 1931 color space will increase by 0.002, and the y coordinate value will increase by 0.003. Therefore, in order to reduce the color shift caused by the increase of the first thickness x1 of the first polymer substrate 104, the first thickness x1 has an upper limit value, for example, the first thickness x1 is less than or equal to 45 μm. Similarly, in order to reduce the color shift caused by the second polymer substrate 206, the second thickness x2 also has an upper limit value, for example, the second thickness x2 is less than or equal to 45 μm.

Figure 7:
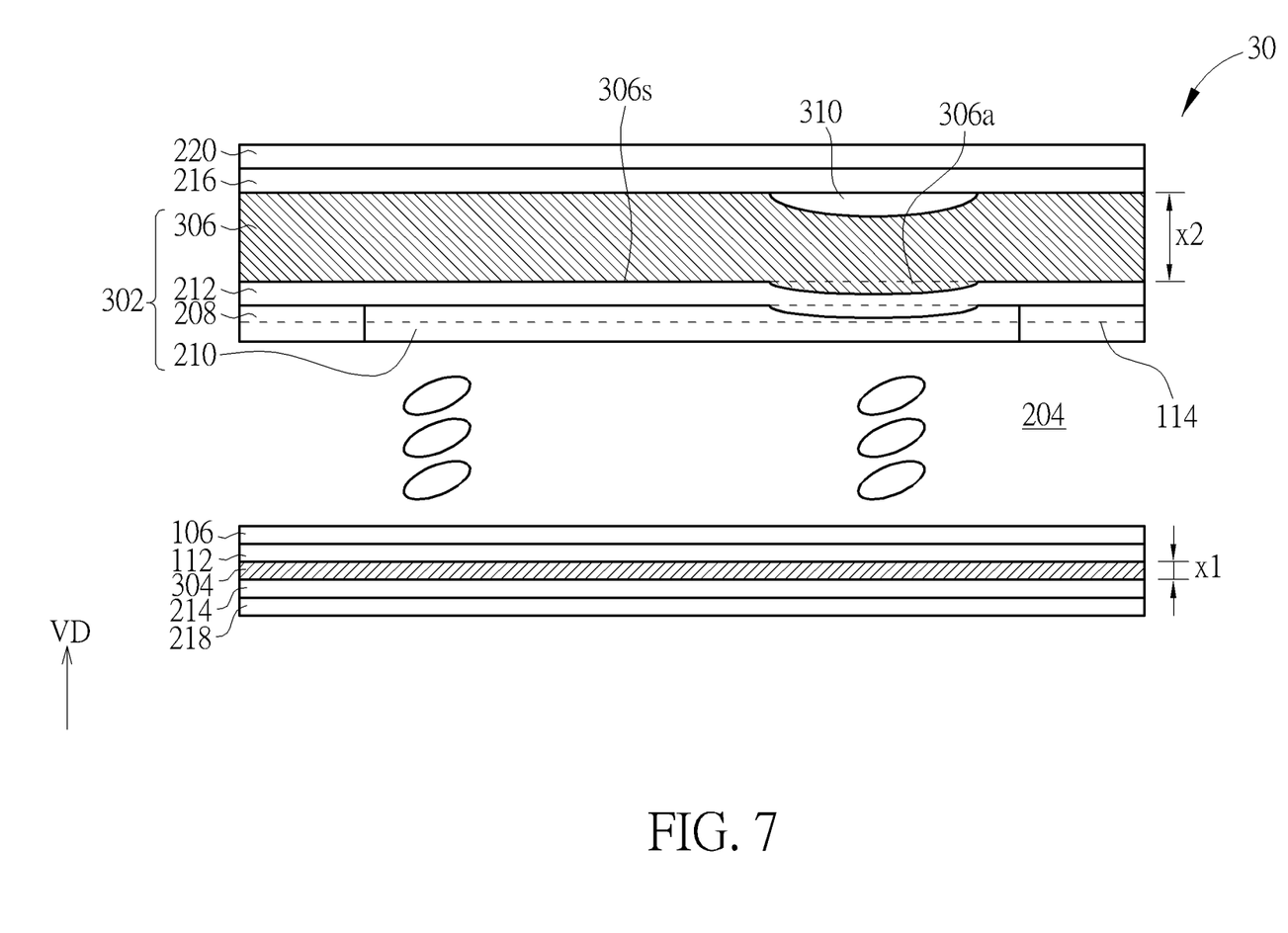
FIG. 7 is a schematic diagram illustrating a cross-sectional view of an electronic device according to a third embodiment of the present disclosure.
Figure 8:
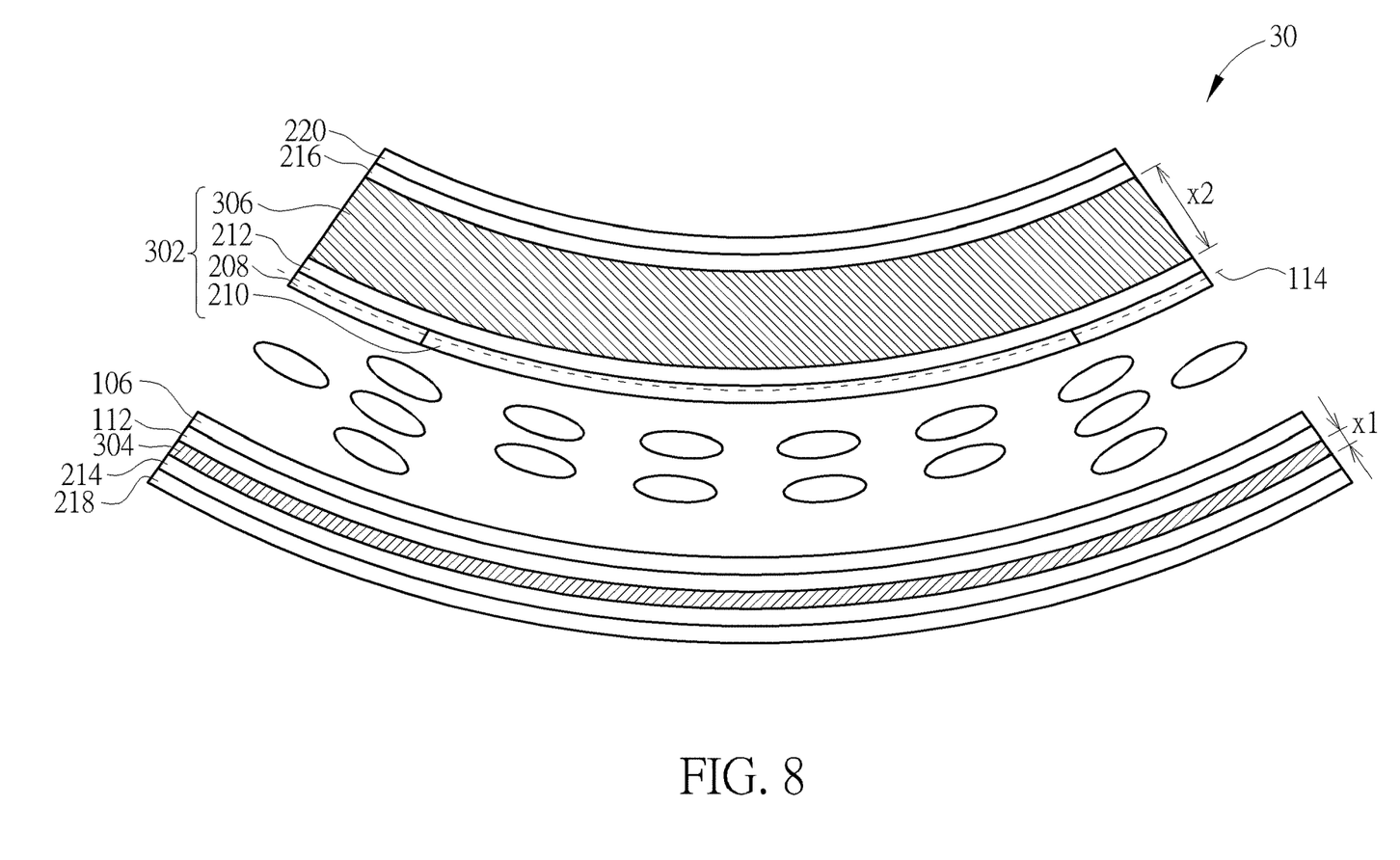
FIG. 8 is a schematic diagram illustrating a cross-sectional view of the electronic device according to the third embodiment of the present disclosure during bending.

FIG. 7 is a schematic diagram illustrating a cross-sectional view of an electronic device according to a third embodiment of the present disclosure, and FIG. 8 is a schematic diagram illustrating a cross-sectional view of the electronic device according to the third embodiment of the present disclosure during bending. For clearly illustrating the bending of each film layer and for the reason that illustration of the protrusion elements and the protrusion portions may blur during bending, FIG. 8 omits the protrusion elements and the protrusion portions, but is not limited thereto. The difference between the electronic device 30 of this embodiment and the electronic device 20 of FIG. 5 is that the component layer of the electronic device 30 includes a black matrix 208 and a color filter layer 210, and the second thickness x2 of the second polymer substrate 306 for disposing the component layer is greater than the first thickness x1 of the first polymer substrate 304 in the top view VD of the electronic device 20, so that the neutral plane 114 can be located adjacent to or in the second component substrate 302. For example, the neutral plane 114 may be located in the black matrix 208, so that when the electronic device 30 is bent or not, the change in size of the opening of the black matrix 208 may be reduced, thereby reducing light leakage or light mixing of adjacent sub-pixels. For example, the first thickness x1 and the second thickness x2 may conform to the formula: 0<(x2−x1)/x2≤0.9. (x2−x1)/x2 may be, for example, greater than or equal to 0.7 and less than or equal to 0.9. The first thickness x1 and the second thickness x2 may be, for example, greater than or equal to about 5 μm and less than or equal to about 45 μm.

In some embodiments, the second polymer substrate 306 may also include a plurality of protrusion elements 310, such as foreign matters or suspended particles, disposed on a surface of the second polymer substrate 306 opposite to the black matrix 208. Since the protrusion elements 310 have certain thicknesses, the second polymer substrate 306 may also include a plurality of protrusion portions 306a protruding from the bottom surface 306s of the second polymer substrate 306. The height of the protrusion portion 306a can be defined as an absolute value of the difference between the average height of the bottom surface 306s without the protrusion portions 306a and the bottom height of the protrusion portion 306a in the top view direction VD of the electronic device 30. The related calculation method has been explained in the related corresponding paragraphs in FIG. 1, so it will not be described again. By means of increasing the thickness of the second polymer substrate 306, the protruding height of the protrusion portion 306a can be reduced to improve the flatness of the bottom surface 306s of the second polymer substrate 306. In some embodiments, the thickness of the color filter layer 210 may be greater than the height of the protrusion portion 306a, so the color filter layer 210 may cross the protrusion portion 306a. For example, the height of the protrusion portion 306a may be, for example, less than 2 µm, but is not limited thereto.

Figure 9:
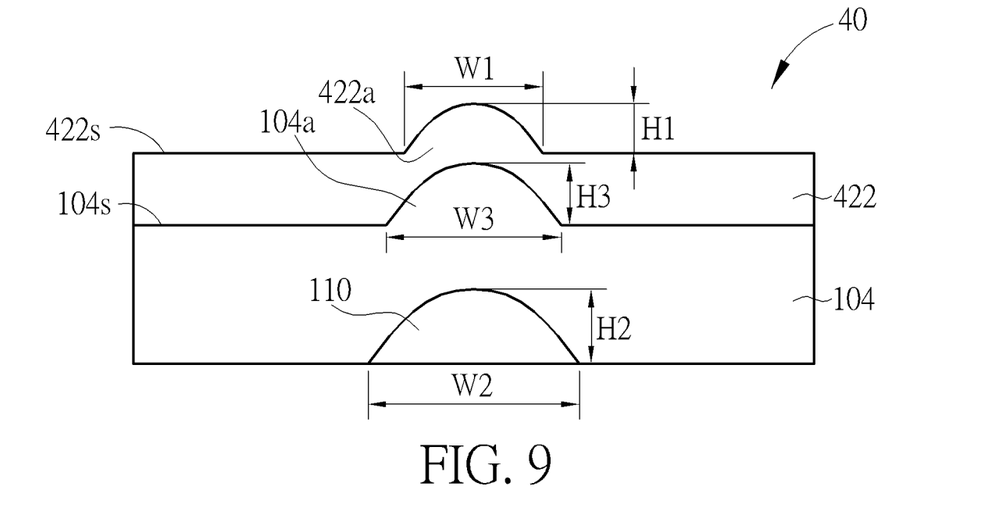
FIG. 9 and FIG. 10 are schematic diagrams illustrating cross-sectional views of electronic devices according to a fourth embodiment and a fifth embodiment of the present disclosure, respectively.
Figure 10:
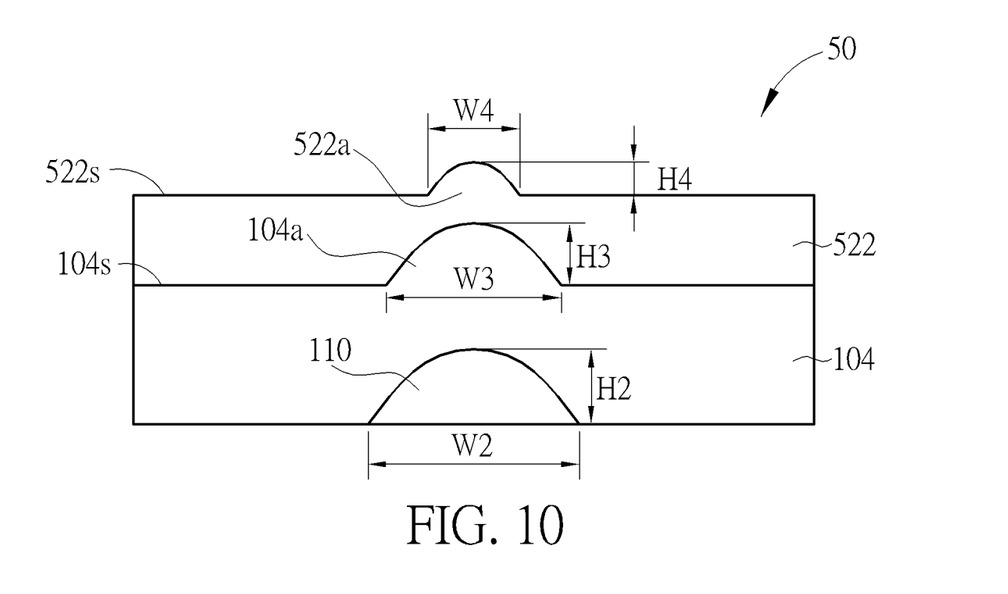

FIG. 9 and FIG. 10 are schematic diagrams illustrating cross-sectional views of electronic devices according to a fourth embodiment and a fifth embodiment of the present disclosure, respectively. In order to clearly show the protrusion element and the corresponding protrusion portion, FIG. 9 and FIG. 10 show a single component substrate, and the component layer in the component substrate is omitted, in which the component substrates of FIG. 9 and FIG. 10 take the first component substrate as an example, but is not limited thereto. As shown in FIG. 9, the electronic device 40 of the fourth embodiment includes a protrusion element 110, a first polymer substrate 104, and an inorganic layer 422, in which the first polymer substrate 104 covers the protrusion element 110, and the inorganic layer 422 covers the first polymer substrate 104. Due to the protrusion element 110, the first polymer substrate 104 includes a protrusion portion 104a protruding from the top surface 104s corresponding to protrusion element 110, and the inorganic layer 422 includes a protrusion portion 422a protruding from the top surface 422s of the inorganic layer 422 on the corresponding protrusion element 110 and the protrusion portion 104a. The inorganic layer 422 includes an inorganic material such as silicon oxide, silicon nitride, or a combination thereof. The maximum width W1 of the protrusion portion 422a of the inorganic layer 422 may be less than the maximum width W2 of the protrusion element 110, or the maximum height H1 of the protrusion portion 422a may be less than the maximum height H2 of the protrusion element 110. In some embodiments, the maximum width W3 of the protrusion portion 104a of the first polymer substrate 104 may be between the maximum width W2 of the protrusion element 110 and the maximum width W1 of the protrusion portion 422a of the inorganic layer 422 or substantially equal to the maximum width W1 of the protrusion portion 422a of the inorganic layer 422, and the maximum height H3 of the protrusion 104a of the first polymer substrate 104 may be between the maximum height H2 of the protrusion element 110 and the maximum width H1 of the protrusion portion 422a of the inorganic layer 422 or substantially equal to the maximum height H1 of the protrusion portion 422a of the inorganic layer 422.

As shown in FIG. 10, the electronic device 50 of the fifth embodiment differs from the electronic device 40 of the fourth embodiment in that the inorganic layer 422 is replaced with an organic layer 522. Since the organic layer 522 includes an organic material, such as photoresist material, PFA or other suitable organic materials and has a fluid property, the top surface 522s of the formed organic layer 522 has better flatness than the inorganic layer, the maximum width W4 of the protrusion portion 522a of the organic layer 522 may be less than the maximum width W1 of the protrusion portion 422a of the inorganic layer 422 of the fourth embodiment, or the maximum height H4 of the protrusion portion 522a may be less than the maximum height H1 of the protrusion portion 422a of the inorganic layer 422 of the fourth embodiment. The maximum width W4 and the maximum height H4 of the protrusion portion 522a of the organic layer 522 may also be less than the maximum width W2 and the maximum height H2 of the protrusion element 110 respectively.

Figure 11:
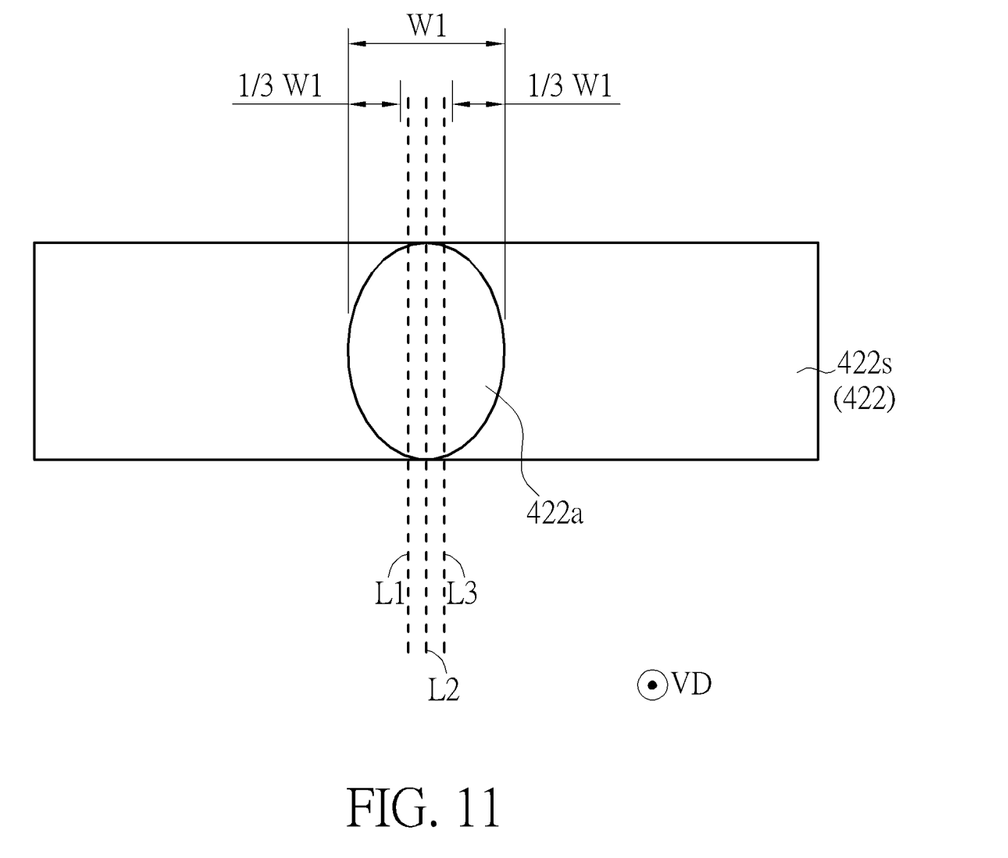
FIG. 11 is a schematic diagram illustrating a top view of FIG. 9.

The method for measuring the top height of the protrusion element and the top height of the protrusion portion according to the present disclosure is further detailed below. Please refer to FIG. 11, which is a schematic diagram illustrating a top view of FIG. 9. FIG. 11 takes the inorganic layer 422 of the fourth embodiment as an example and omits the component layer in the component substrate, but is not limited thereto. The height of the protrusion portion 422a described below can be obtained, for example, by calculating absolute values of the differences between points and a reference level based on the same reference level. The method of measuring the top height of the protrusion portion 422a of the inorganic layer 422 may include defining at least three virtual line segments that pass through the protrusion portion 422a in the top view direction VD, and all three virtual line segments pass through positions close to a center of the protrusion 422a (e.g., within a range from a position at the left of the center and spaced apart from the center by one sixth of the width of the protrusion portion 422a to another position at the right of the center and spaced apart from the center by one sixth of the width of the protrusion portion 422a, i.e., within an intermediate section of one third of the width of the protrusion portion 422a). The three virtual line segments may be for example a first virtual line segment L1, a second virtual line segment L2 and a third virtual line segment L3, respectively. Then, an absolute value of the difference between a top level of the protrusion element 110 on each virtual line segment and the reference level is measured and followed by adding up and averaging the absolute values (e.g., (PH1+PH2+PH3)/3), so as to obtain the top height of the protrusion portion 422a, for example adding up and averaging the first top height PH1 corresponding to the first virtual line segment L1, the second top height PH2 corresponding to the second virtual line segment L2 and the third top height PH3 corresponding to the third virtual line segment L3. In some embodiments, the method for measuring the top height of the protrusion portion 422a can also measure the absolute value of the difference between a top level of the protrusion portion 422a on each virtual line segment and the reference level and the absolute value of the difference between a bottom level of the protrusion portion 422a on each virtual line segment and the reference level, and the absolute values of the differences between the bottom levels and the reference level are the bottom heights, such as the first bottom height PL1, the second bottom height PL2 and the third bottom height PL3. Then, the average value of the top height and the bottom height of each virtual line segment is calculated respectively, and then the average values of the virtual line segments are added up and averaged to obtain an average value (e.g., (PH1+PL1)/2+(PH2+PL2)/2+(PH3+PL3)/2)/3), thereby obtaining the top height of the protrusion portion 422a. In one embodiment, the bottom height of the protrusion portion 422a excludes the edge height of the protrusion portion 422a. The instrument for measuring the top height and the bottom height may be, for example, a confocal microscope. In some embodiments, the top height of the protrusion portion of the organic layer can also be measured by the above method. The top height of the protrusion portion of the first polymer substrate can also be measured by removing the inorganic layer or the organic layer in combination with the above method. The top height of the protrusion element can be measured by removing the inorganic layer or the organic layer and the first polymer substrate in combination with the above method.

In summary, in the electronic device of the present disclosure, by means of increasing the first thickness of the first polymer substrate or the second thickness of the second polymer substrate, the protruding height of the protrusion portion can be reduced to improve the surface flatness of the first polymer substrate or the second polymer substrate, thereby reducing the damage to the component layer formed on the first polymer substrate or the second polymer substrate. Alternatively, by means of increasing the first thickness of the first polymer substrate or the second thickness of the second polymer substrate, the neutral plane can be adjusted to be located adjacent to or in the first component substrate or the second component substrate, thereby reducing damage to the component during bending or reducing poor display of the display device.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A display device, comprising:
    a first polymer substrate, wherein the first polymer substrate comprises a plurality of protrusion elements and a single-layer polymer substrate;
    a second polymer substrate disposed opposite to the first polymer substrate;
    a liquid crystal layer disposed between the first polymer substrate and the second polymer substrate; and
    a neutral plane located between the liquid crystal layer and the first polymer substrate or located in the first polymer substrate, wherein a stress on the display device located on the neutral plane is equal to 0 when the display device is bent;
    wherein the plurality of protrusion elements are disposed under a top surface of the single-layer polymer substrate facing the liquid crystal layer, the first polymer substrate has a first thickness, the second polymer substrate has a second thickness, and the first thickness is greater than the second thickness, and
    wherein the first thickness and the second thickness conform to a formula: $0<(x1-x2)/x1\leq0.9$, where x1 is the first thickness, and x2 is the second thickness.

2. The display device according to claim 1, further comprising a plurality of thin-film transistors disposed on the top surface of the single-layer polymer substrate.

3. The display device according to claim 1, wherein the first thickness or the second thickness is greater than or equal to 5 µm and less than or equal to 45 µm.

4. The display device according to claim 1, wherein the first polymer substrate further comprises a plurality of protrusion portions respectively corresponding to one of the plurality of protrusion elements, and the plurality of protrusion portions protrude from the top surface of the single-layer polymer substrate, and the display device comprises a metal pattern layer crossing one of the plurality of protrusion portions.

5. The display device according to claim 4, wherein a thickness of the metal pattern layer is greater than a height of the one of the plurality of protrusion portions.

6. The display device according to claim 1, further comprising an inorganic layer or an organic layer disposed on the first polymer substrate, wherein the inorganic layer or the organic layer comprising a protrusion portion, a width of the protrusion portion is less than a width of one of the plurality of protrusion elements, and a height of the protrusion portion is less than a height of the one of the plurality of protrusion elements.

7. The display device according to claim 2, further comprising a stress buffer layer disposed between the plurality of thin-film transistors and the first polymer substrate.

8. The display device according to claim 2, further comprising a transparent photoresist layer disposed between the plurality of thin-film transistors and the first polymer substrate.

9. The display device according to claim 1, wherein the display device has a neutral plane, and a distance between the neutral plane and the first polymer substrate is less than a distance between the neutral plane and the second polymer substrate.

10. The display device according to claim 2, wherein the display device further comprises a first phase retardation film disposed on a side of the first polymer substrate opposite to the plurality of thin-film transistors, a phase retardation value of the first polymer substrate in an in-plane direction is 0, and a phase retardation value of the first polymer substrate in a film thickness direction is less than or equal to 300 nm.

11. A bendable display device, comprising:
    a component substrate comprising a polymer substrate and a component layer, wherein the component layer is disposed on the polymer substrate, and the component layer comprises a black matrix and a color filter layer; and
    a neutral plane located adjacent to the component substrate or located in the component substrate, wherein a stress on the bendable display device located on the neutral plane is equal to 0 when the bendable display device is bent;
    another component substrate disposed opposite to the component substrate, wherein the another component substrate comprises another polymer substrate and a plurality of thin-film transistors, and the plurality of thin-film transistors are disposed on the another polymer substrate; and
    a liquid crystal layer disposed between the component substrates,
    wherein the another polymer substrate has a first thickness, the polymer substrate has a second thickness, the second thickness is greater than the first thickness, the polymer substrate comprises a plurality of protrusion elements, and the plurality of protrusion elements are disposed on a surface of the polymer substrate, and
    wherein the polymer substrate further comprises a plurality of protrusion portions respectively corresponding to one of the plurality of protrusion elements, and the plurality of protrusion portions protrude from a bottom surface of the polymer substrate.

12. The bendable display device according to claim 11, wherein the polymer substrate has a thickness greater than or equal to 5 µm and less than or equal to 45 µm.

13. The bendable display device according to claim 11, wherein the first thickness and the second thickness conform to a formula: $0<(x2-x1)/x2\leq0.9$, where x1 is the first thickness, and x2 is the second thickness.

14. The bendable display device according to claim 11, wherein a distance between the neutral plane and the polymer substrate is less than a distance between the neutral plane and the another polymer substrate.

* * * * *